(12) United States Patent
Zimmel et al.

(10) Patent No.: US 8,331,753 B2
(45) Date of Patent: Dec. 11, 2012

(54) FIBER OPTIC MODULE AND SYSTEM INCLUDING REAR CONNECTORS

(75) Inventors: Steven C. Zimmel, Minneapolis, MN (US); Ponharith Nhep, Savage, NH (US); Trevor Smith, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/236,026

(22) Filed: Sep. 19, 2011

(65) Prior Publication Data

US 2012/0014655 A1 Jan. 19, 2012

Related U.S. Application Data

(63) Continuation of application No. 12/561,676, filed on Sep. 17, 2009, now Pat. No. 8,023,791, which is a continuation of application No. 12/150,757, filed on Apr. 29, 2008, now Pat. No. 7,593,614, which is a continuation of application No. 10/980,978, filed on Nov. 3, 2004, now Pat. No. 7,376,322.

(51) Int. Cl.
*G02B 6/00* (2006.01)

(52) U.S. Cl. .................................................... 385/135

(58) Field of Classification Search .......... 385/134–135, 385/137

See application file for complete search history.

(56) References Cited

U.S. PATENT DOCUMENTS

| | | | |
|---|---|---|---|
| 4,650,933 A | 3/1987 | Benda et al. | |
| 4,768,961 A | 9/1988 | Lau | |
| 4,770,639 A | 9/1988 | Lau | |
| 4,797,114 A | 1/1989 | Lau | |
| 4,820,200 A | 4/1989 | Lau | |
| 4,840,568 A | 6/1989 | Burroughs et al. | |
| 5,189,410 A | 2/1993 | Kosugi et al. | |
| 5,199,878 A | 4/1993 | Dewey et al. | |
| 5,214,673 A | 5/1993 | Morgenstern et al. | |
| 5,317,663 A | 5/1994 | Beard et al. | |
| 5,339,379 A | 8/1994 | Kutsch et al. | |
| 5,363,465 A | 11/1994 | Korkowski et al. | |
| 5,393,249 A | 2/1995 | Morgenstern et al. | |
| 5,432,875 A | 7/1995 | Korkowski et al. | |
| 5,467,062 A | 11/1995 | Burroughs | |

(Continued)

FOREIGN PATENT DOCUMENTS

DE 41 30 706 A1 3/1993

(Continued)

OTHER PUBLICATIONS

ADC Telecommunications, Inc., OmniReach FTTP Solutions, Doc. No. 1276550, dated May 2004, 12 pp.

(Continued)

*Primary Examiner* — Eric Wong
(74) *Attorney, Agent, or Firm* — Merchant & Gould P.C.

(57) ABSTRACT

A telecommunications assembly including a housing and a plurality of modules mounted within the housing. The modules includes a rear face in which is mounted at least one fiber optic connector. Within an interior of the housing are positioned at least one fiber optic adapters. Inserting the module through a front opening of the housing at a mounting location positions the connector of the module for insertion into and mating with the adapter of the housing. The adapters within the interior of the housing are mounted to a removable holder. A method of mounting a telecommunications module within a chassis.

9 Claims, 14 Drawing Sheets

U.S. PATENT DOCUMENTS

| | | | |
|---|---|---|---|
| 5,497,444 A | | 3/1996 | Wheeler |
| 5,582,525 A | | 12/1996 | Louwagie et al. |
| 5,613,030 A | * | 3/1997 | Hoffer et al. ............... 385/135 |
| 5,627,925 A | | 5/1997 | Alferness et al. |
| 5,685,741 A | | 11/1997 | Dewey et al. |
| 5,694,511 A | | 12/1997 | Pimpinella et al. |
| 5,701,380 A | | 12/1997 | Larson et al. |
| 5,717,810 A | | 2/1998 | Wheeler |
| 5,946,440 A | | 8/1999 | Puetz |
| 6,116,961 A | | 9/2000 | Henneberger et al. |
| 6,208,796 B1 | * | 3/2001 | Williams Vigliaturo ..... 385/135 |
| 6,226,111 B1 | | 5/2001 | Chang et al. |
| 6,263,136 B1 | | 7/2001 | Jennings et al. |
| 6,307,998 B2 | | 10/2001 | Vigliaturo |
| 6,328,608 B1 | | 12/2001 | Olson et al. |
| 6,363,183 B1 | | 3/2002 | Koh |
| 6,370,294 B1 | | 4/2002 | Pfeiffer et al. |
| 6,418,262 B1 | | 7/2002 | Puetz et al. |
| 6,424,781 B1 | | 7/2002 | Puetz et al. |
| 6,511,330 B1 | | 1/2003 | Norris |
| 6,532,332 B2 | | 3/2003 | Solheid et al. |
| 6,535,682 B1 | | 3/2003 | Puetz et al. |
| 6,554,652 B1 | | 4/2003 | Musolf et al. |
| 6,556,738 B2 | | 4/2003 | Pfeiffer et al. |
| 6,556,763 B1 | | 4/2003 | Puetz et al. |
| 6,579,014 B2 | | 6/2003 | Melton et al. |
| 6,591,051 B2 | | 7/2003 | Solheid et al. |
| 6,614,953 B2 | | 9/2003 | Strasser et al. |
| 6,616,459 B2 | | 9/2003 | Norris |
| 6,632,106 B2 | | 10/2003 | Musolf et al. |
| RE38,311 E | | 11/2003 | Wheeler |
| 6,647,197 B1 | | 11/2003 | Marrs et al. |
| 6,668,108 B1 | | 12/2003 | Helkey et al. |
| 6,760,531 B1 | | 7/2004 | Solheid et al. |
| 6,810,193 B1 | | 10/2004 | Müller |
| 6,822,874 B1 | | 11/2004 | Marier |
| 6,830,465 B2 | | 12/2004 | Norris et al. |
| 6,848,952 B2 | | 2/2005 | Norris |
| 6,850,685 B2 | | 2/2005 | Tinucci et al. |
| 6,885,798 B2 | | 4/2005 | Zimmel |
| 6,890,187 B2 | | 5/2005 | Norris |
| 7,142,764 B2 | | 11/2006 | Allen et al. |
| 7,218,827 B2 | | 5/2007 | Vongseng et al. |
| 7,333,606 B1 | | 2/2008 | Swam et al. |
| 7,376,322 B2 | | 5/2008 | Zimmel et al. |
| 7,453,706 B2 | | 11/2008 | Clark et al. |
| 7,495,931 B2 | | 2/2009 | Clark et al. |
| 2002/0181896 A1 | | 12/2002 | McClellan et al. |
| 2003/0031423 A1 | | 2/2003 | Zimmel |
| 2003/0132685 A1 | | 7/2003 | Sucharczuk et al. |
| 2003/0134541 A1 | | 7/2003 | Johnsen et al. |
| 2003/0147597 A1 | | 8/2003 | Duran |
| 2003/0169974 A1 | | 9/2003 | Ngo |
| 2003/0185535 A1 | | 10/2003 | Tinucci et al. |
| 2003/0202765 A1 | | 10/2003 | Franklin et al. |
| 2004/0240826 A1 | | 12/2004 | Daoud et al. |
| 2005/0002633 A1 | | 1/2005 | Solheid et al. |
| 2005/0053341 A1 | | 3/2005 | Zimmel |
| 2005/0067847 A1 | | 3/2005 | Zellak |
| 2005/0105873 A1 | | 5/2005 | Reagan et al. |
| 2005/0105879 A1 | | 5/2005 | Kanasaki et al. |
| 2005/0232550 A1 | | 10/2005 | Nakajima et al. |
| 2005/0232551 A1 | | 10/2005 | Chang et al. |
| 2005/0232565 A1 | | 10/2005 | Heggestad et al. |
| 2005/0281526 A1 | | 12/2005 | Vongseng et al. |
| 2006/0083468 A1 | | 4/2006 | Kahle et al. |
| 2006/0269205 A1 | | 11/2006 | Zimmel |
| 2006/0269206 A1 | | 11/2006 | Zimmel |
| 2006/0285807 A1 | | 12/2006 | Lu et al. |
| 2007/0047893 A1 | | 3/2007 | Kramer et al. |
| 2007/0147765 A1 | | 6/2007 | Gniadek et al. |

FOREIGN PATENT DOCUMENTS

| | | |
|---|---|---|
| DE | 202 01 170 U1 | 5/2002 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| WO | WO 00/75706 A2 | 12/2000 |
| WO | WO 02/099528 A1 | 12/2002 |
| WO | WO 02/103429 A2 | 12/2002 |
| WO | WO 03/093889 A1 | 11/2003 |

OTHER PUBLICATIONS

ADC Telecommunications, Inc., DSX-3 Digital Signal Cross-Connect, Doc. No. 274, dated Oct. 2004, 65 pp.

ADCTelecommunications, Inc., DS3 Digital Signal Cross-Connect (DSX3) System Application Guide, Document No. ADCP-80-323, 1st Edition, Issue 2, Dec. 1996, p. 1-10; p. 1-11.

ADC Telecommunications, Inc., DSX-1 Digital Signal Cross Connect PIX-DSX-1—Fifth Edition, dated Oct. 1994, 36 Pages.

ADC Telecommunications, Inc., PxPlus™ DS1 Digital Signal Cross-Connect, dated Jan. 1997, 12 Pages.

Pending U.S. Appl. No. 11/354,297, Zimmel et al, filed Feb. 13, 2006.

European Search Report mailed Jul. 22, 2008.

European Search Report mailed Oct. 12, 2010.

Prosecution History of U.S. Appl. No. 11/138,063 (OA Dec. 27, 2006; Resp. Apr. 27, 2007; OA Jul. 30, 2007).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance Aug. 2, 2007).

Prosecution History of U.S. Appl. No. 11/354,297 (OA Jun. 25, 2007).

* cited by examiner

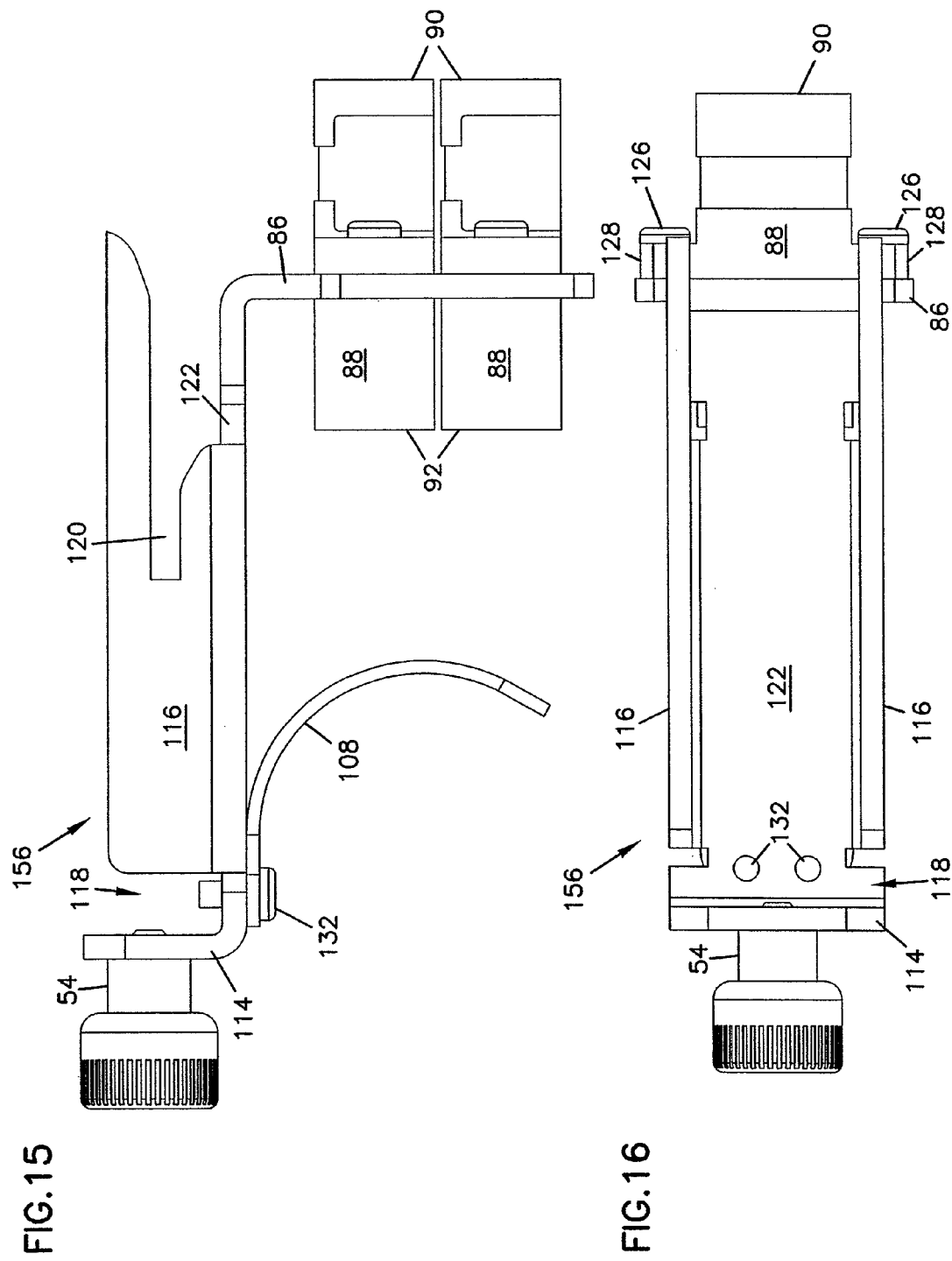

FIBER OPTIC MODULE AND SYSTEM INCLUDING REAR CONNECTORS

CROSS REFERENCE TO RELATED APPLICATIONS

This application is a continuation of application Ser. No. 12/561,676, filed Sep. 17, 2009, which is a continuation of application Ser. No. 12/150,757, filed Apr. 29, 2008, now U.S. Pat. No. 7,593,614, issued Sep. 22, 2009, which is a continuation of application Ser. No. 10/980,978, filed Nov. 3, 2004, now U.S. Pat. No. 7,376,322, issued May 20, 2008, which applications are incorporated herein by reference in their entirety.

FIELD

The present invention generally relates to fiber optic telecommunications equipment. More specifically, the present invention relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

SUMMARY

The present invention relates to a telecommunications assembly including a housing and a plurality of modules mounted within the housing. The modules includes a rear face in which is mounted at least one fiber optic connector. Within an interior of the housing are positioned at least one fiber optic adapters. Inserting the module through a front opening of the housing at a mounting location positions the connector of the module for insertion into and mating with the adapter of the housing. The adapters within the interior of the housing are mounted to a removable adapter holder. The present invention further relates to a method of mounting a telecommunications module within a chassis.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 15 is a side view of the adapter holder of FIG. 12.
FIG. 16 is a top view of the adapter holder of FIG. 12.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
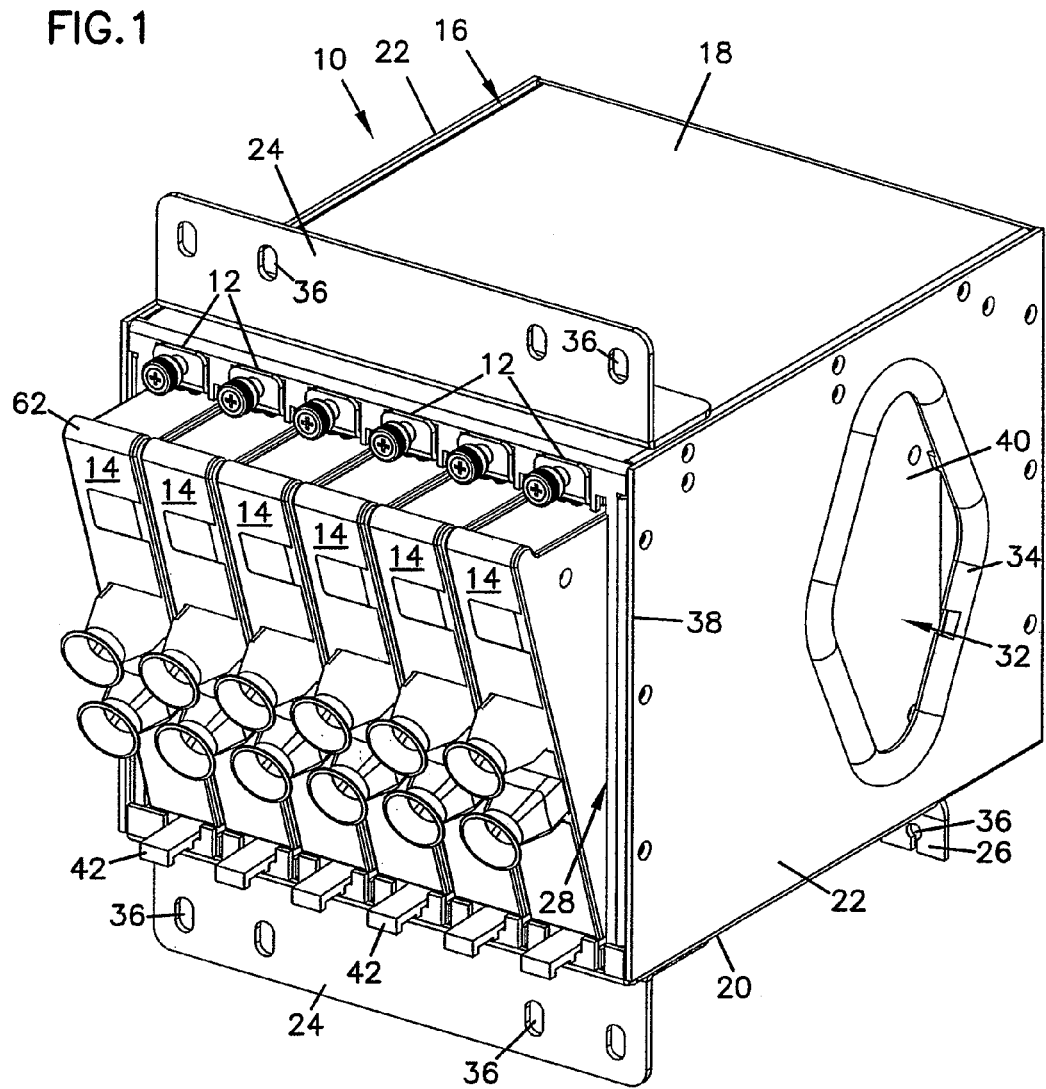
FIG. 1 is a front perspective view of a telecommunications assembly with a plurality of fiber optic modules installed through a front opening.

FIG. 1 illustrates a telecommunications assembly 10 with mounting locations 12 for mounting a plurality of modules 14. Assembly 10 includes a chassis or housing 16 with a first major side 18, a second major side 20 and a pair of opposing transverse sides 22 extending between the first and second major sides. A mounting flange 24 may be mounted to each of the major sides extending generally oppositely of each other. A secondary or alternative mounting flange 26 may also be mounted to one of the major sides to provide options for mounting housing 16 to a particular size or shape of equipment rack, cabinet or other type of installation.

Housing 16 defines a front opening 28 through which modules 14 are inserted within an interior 30 (shown below in FIG. 7) of housing 16. Openings 32 may be defined in the transverse sides 22 to permit access by a person into interior 30. Openings 32 may include a protective pad 34 about a perimeter to provide chafe and other injury to any hands which may pass into or out of interior 30 through one of the openings 32. Visible through opening 32 in FIG. 1 is a housing 40 of one of the modules 14 mounted within front opening 28. Flanges 24 and 26 may include a plurality of fastener openings 36 for mounting housing 16 where needed in a telecommunications installation.

Figure 2:
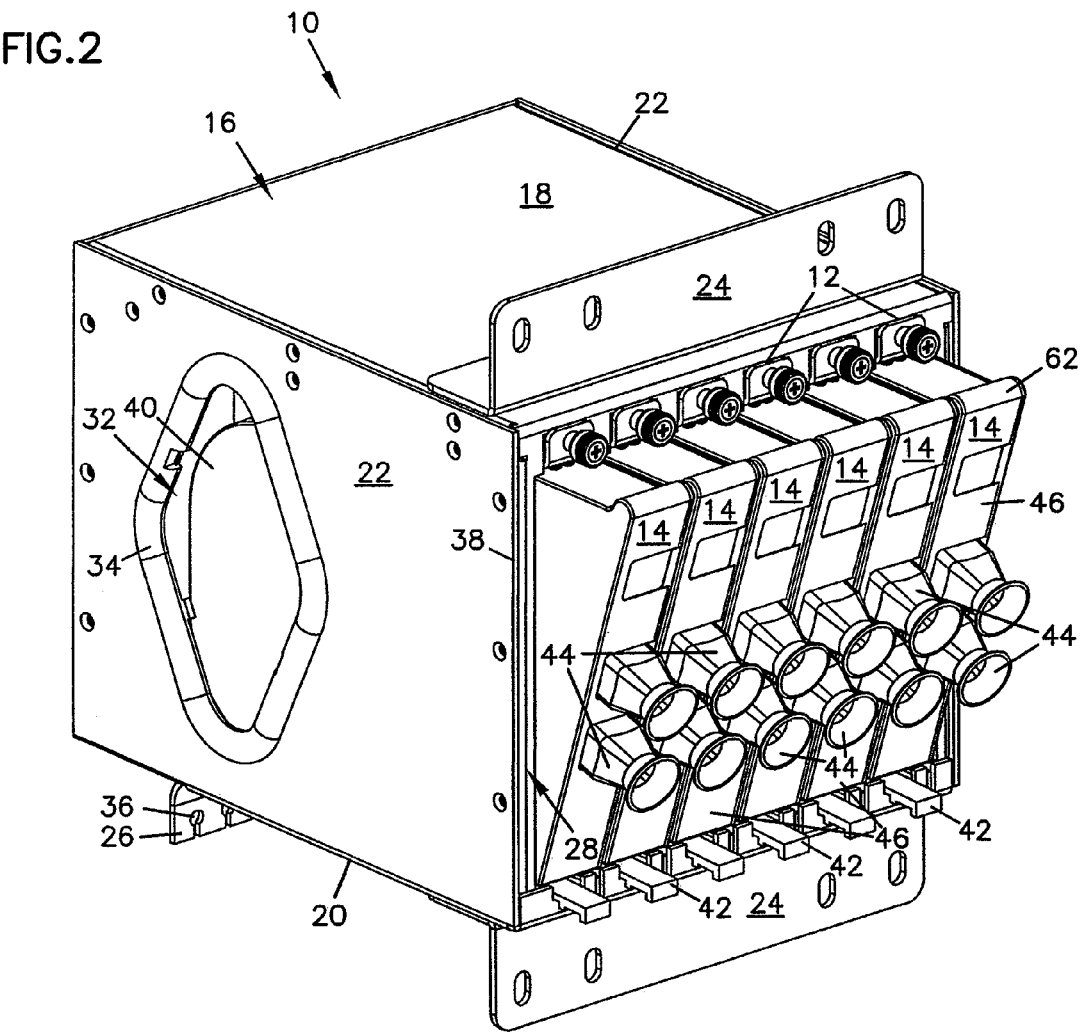
FIG. 2 is a front perspective of the telecommunications assembly of FIG. 1, taken from an opposite side.

Referring now to FIG. 2, each module 14 includes a releasably catch 42 adjacent second major side 20. As can be seen below in and described with to FIG. 10, catch 42 engages a portion of housing 16 to hold module 14 within front opening 28 and can also be deflected to permit withdrawal of module 14 from housing 16. Each module 14 also may include one or more cable exits 44 extending from a front face 46. Cable exits 44 permit telecommunications cables within module 14 to be directed outside of module 14, as will be described below with regard to FIG. 10. As shown in FIG. 2, front faces 46 of modules 14 are angled with regard to front opening 28, which may aid in the direction of cables exiting module 14 toward a desired location in the telecommunications installation. It is anticipated that front faces 46 could be made generally parallel to front edges 38 of transverse sides 22 at front opening 28 within the scope of the present disclosure.

Figure 3:
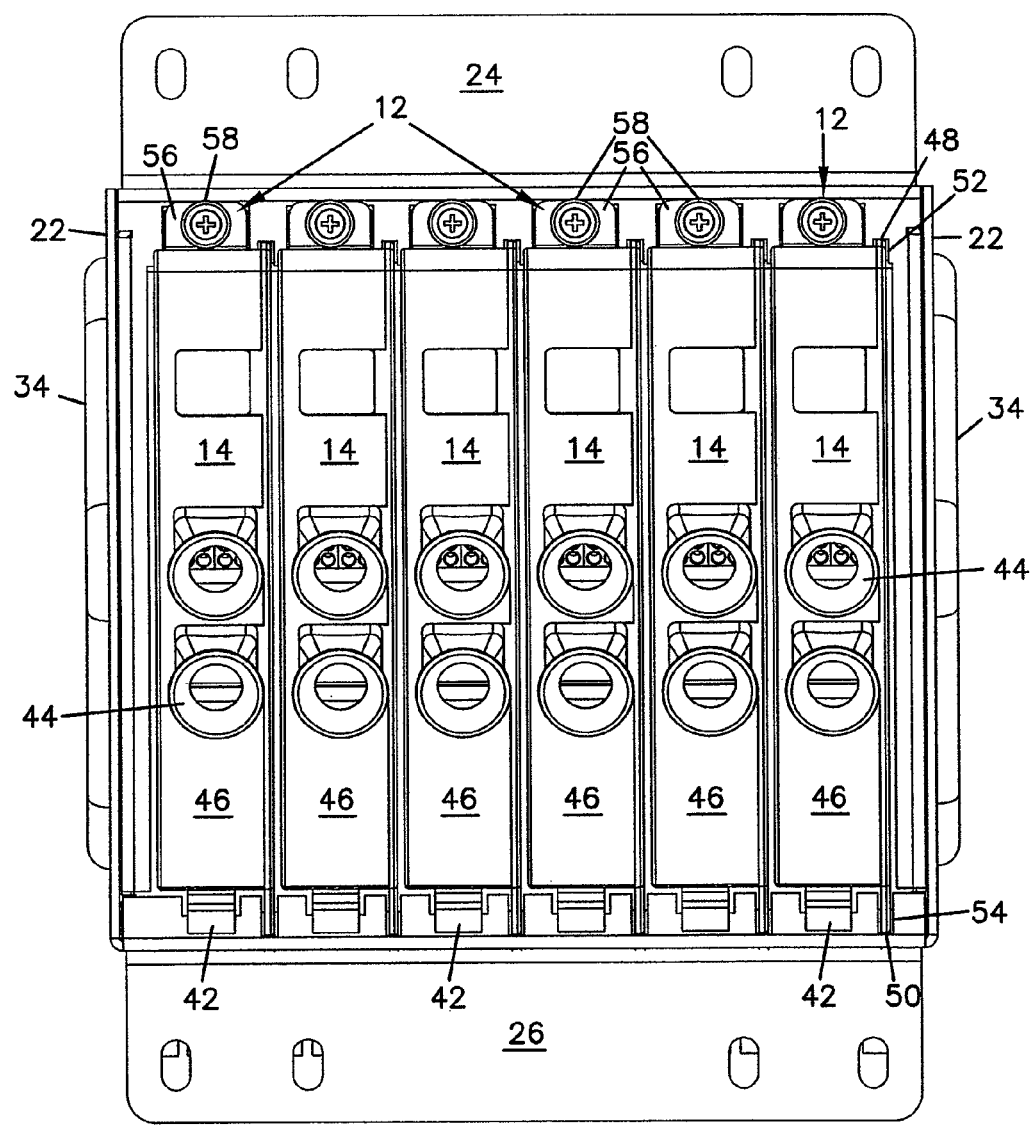
FIG. 3 is a front view of the telecommunications assembly of FIG. 1.

Referring now to FIG. 3, modules 14 includes unequal length flanges 48 and 50 which are received within correspondingly sized slots 52 and 54, respectively. Flange 48 and slot 52 are smaller in size than flange 50 and slot 54. Slot 52 is sized so that, while flange 48 may be received within slot 52, larger flange 50 will not fit. This ensures that modules 14 are positioned within front opening 28 in a particular desired orientation. Similar flanges are described in commonly-owned U.S. Pat. No. 5,363,465, the disclosure of which is incorporated herein by reference. Opposite latch 42 and mounted to housing 16 at each mounting location 12 are an adapter holder 56 releasably held within front opening 28 by a thumbscrew 58. Adapter holder 56 is described in further detail below with regard to FIGS. 9 to 16.

Figure 4:
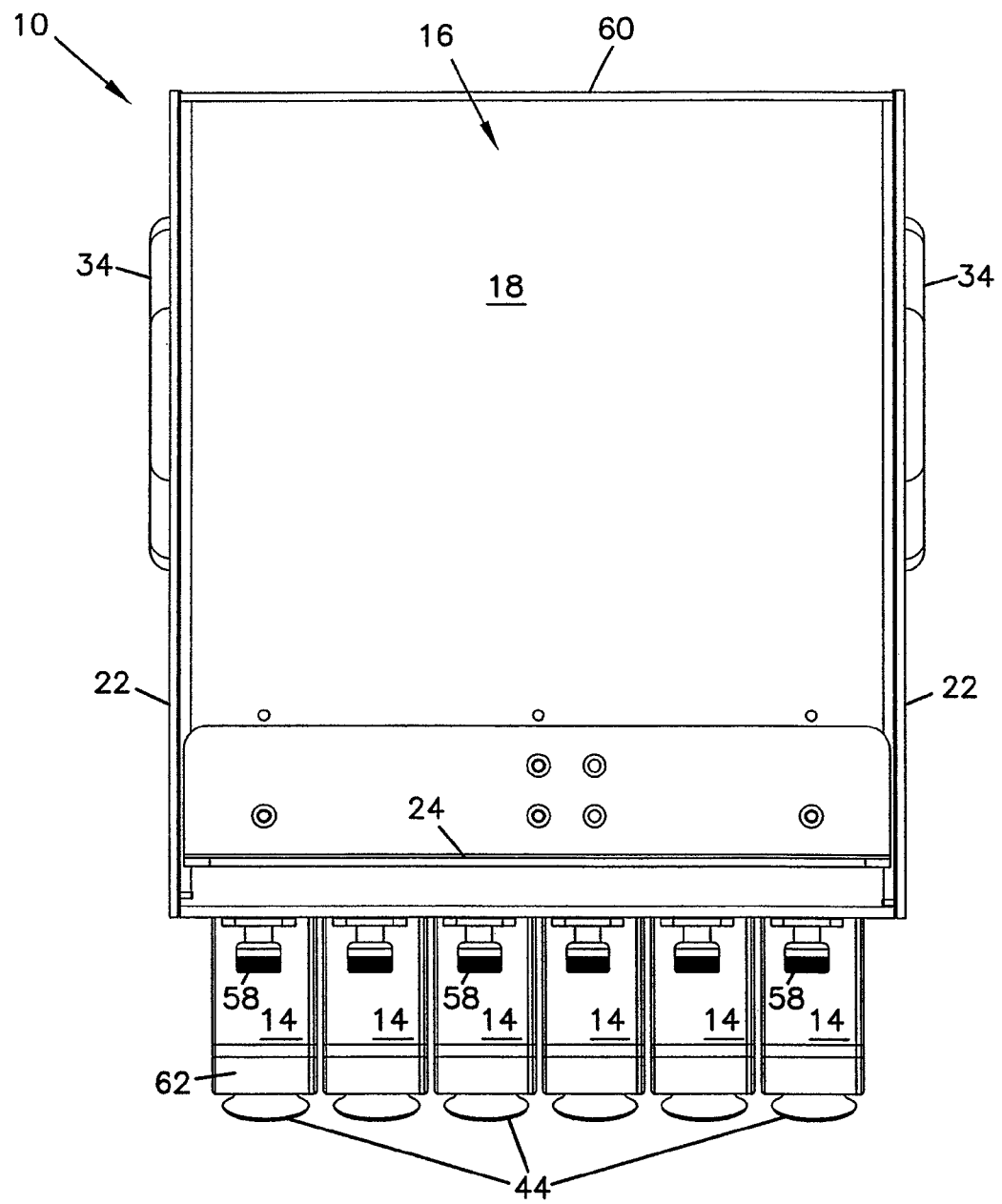
FIG. 4 is a top view of the telecommunications assembly of FIG. 1.
Figure 5:
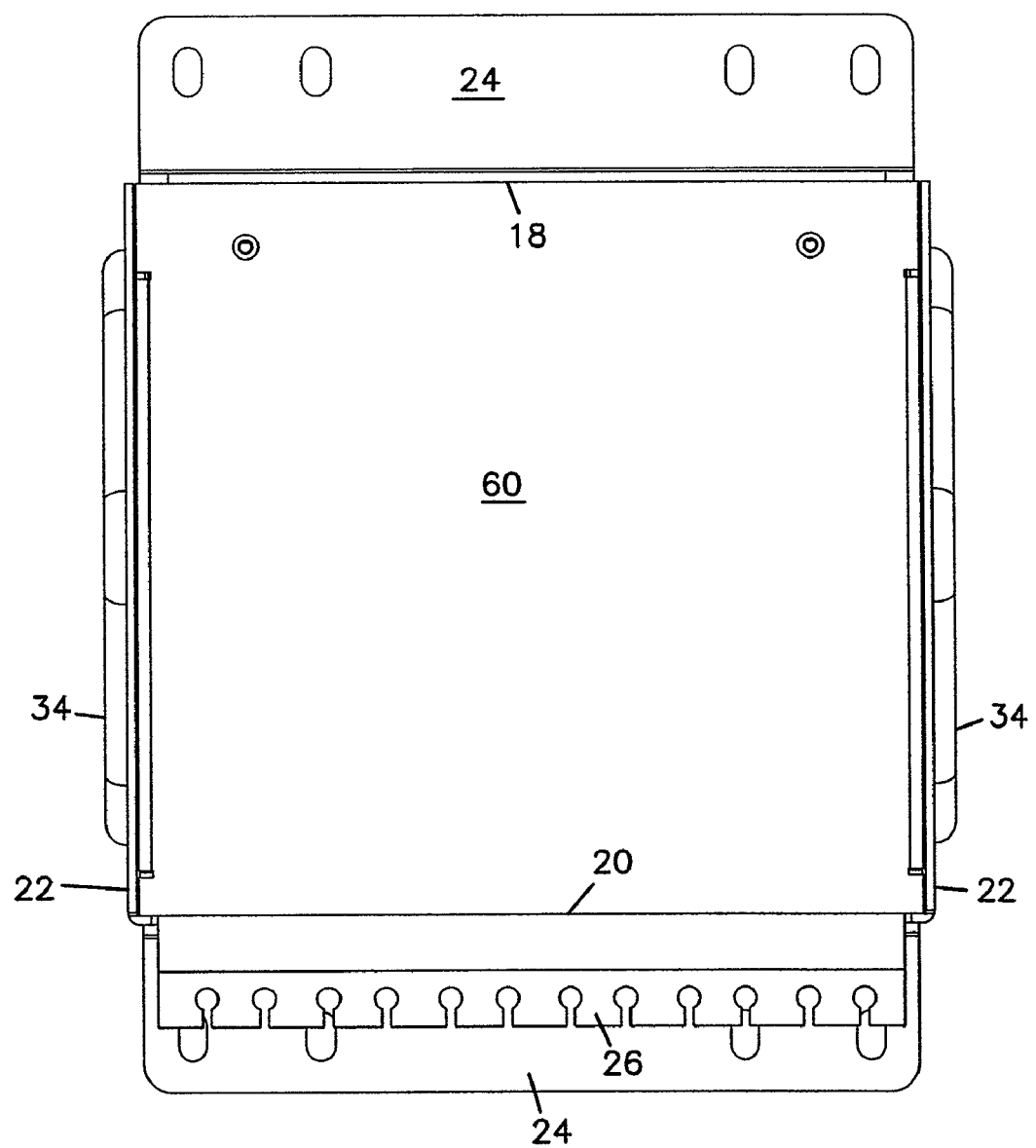
FIG. 5 is a rear view of the telecommunications assembly of FIG. 1.
Figure 6:
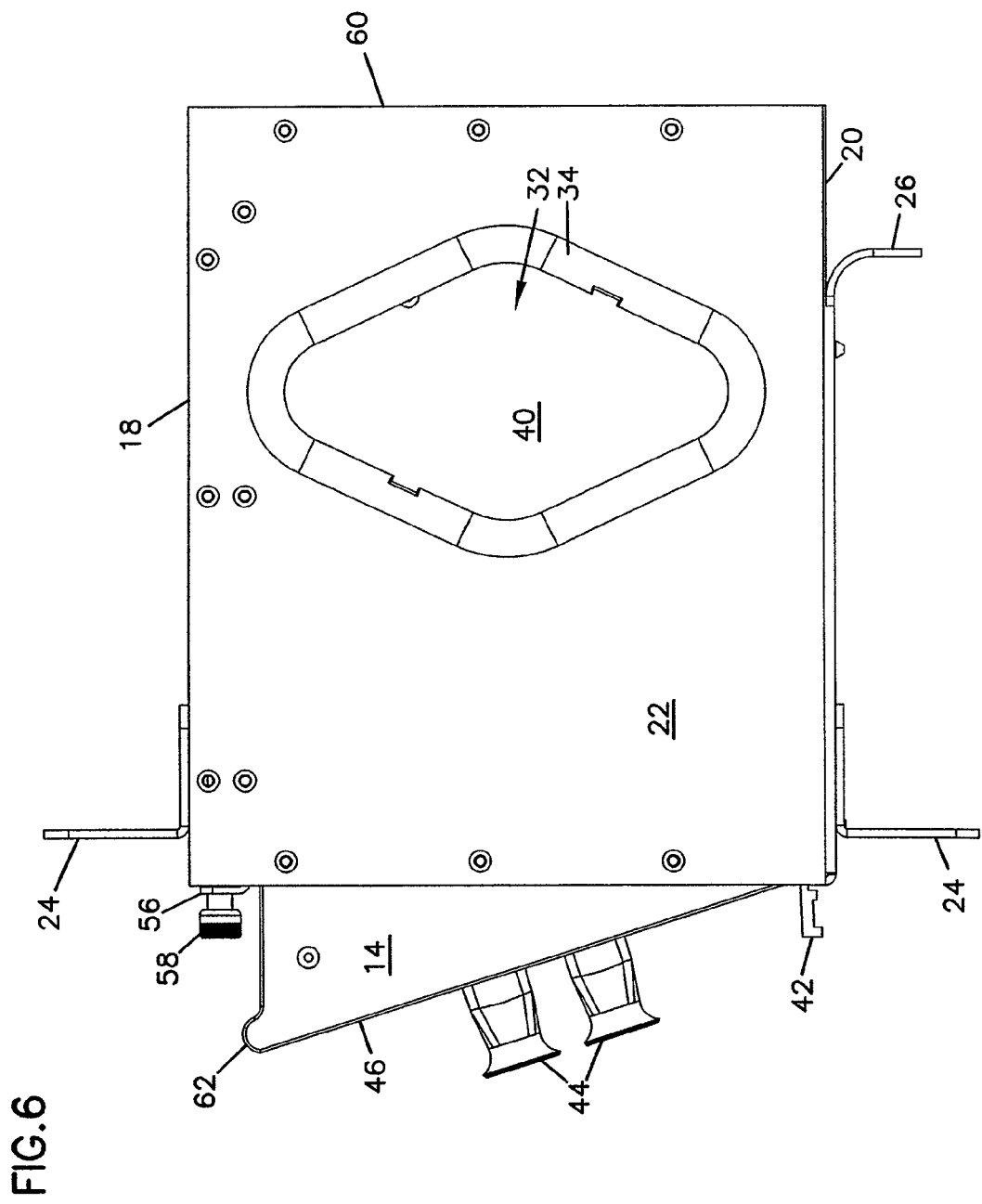
FIG. 6 is a side view of the telecommunications assembly of FIG. 1.

Referring now to FIGS. 4 and 5, housing 16 further includes a back 60 opposite front opening 28, substantially closing off the rear of housing 16. Openings may be provided through back 60 to allow cables or air to pass, but it is anticipated that user access into interior 30 of housing 16 will be made through front opening 28. As shown in FIG. 6, on one end of modules 14, a lip or finger grip 62 may be included to aid removal of module 14 from housing 16. Finger grip 62 is preferably positioned on module 14 opposite latch 42 so that a user may apply opposing force with fingers or hands to securely grasp the module and remove it from housing 16.

Figure 7:
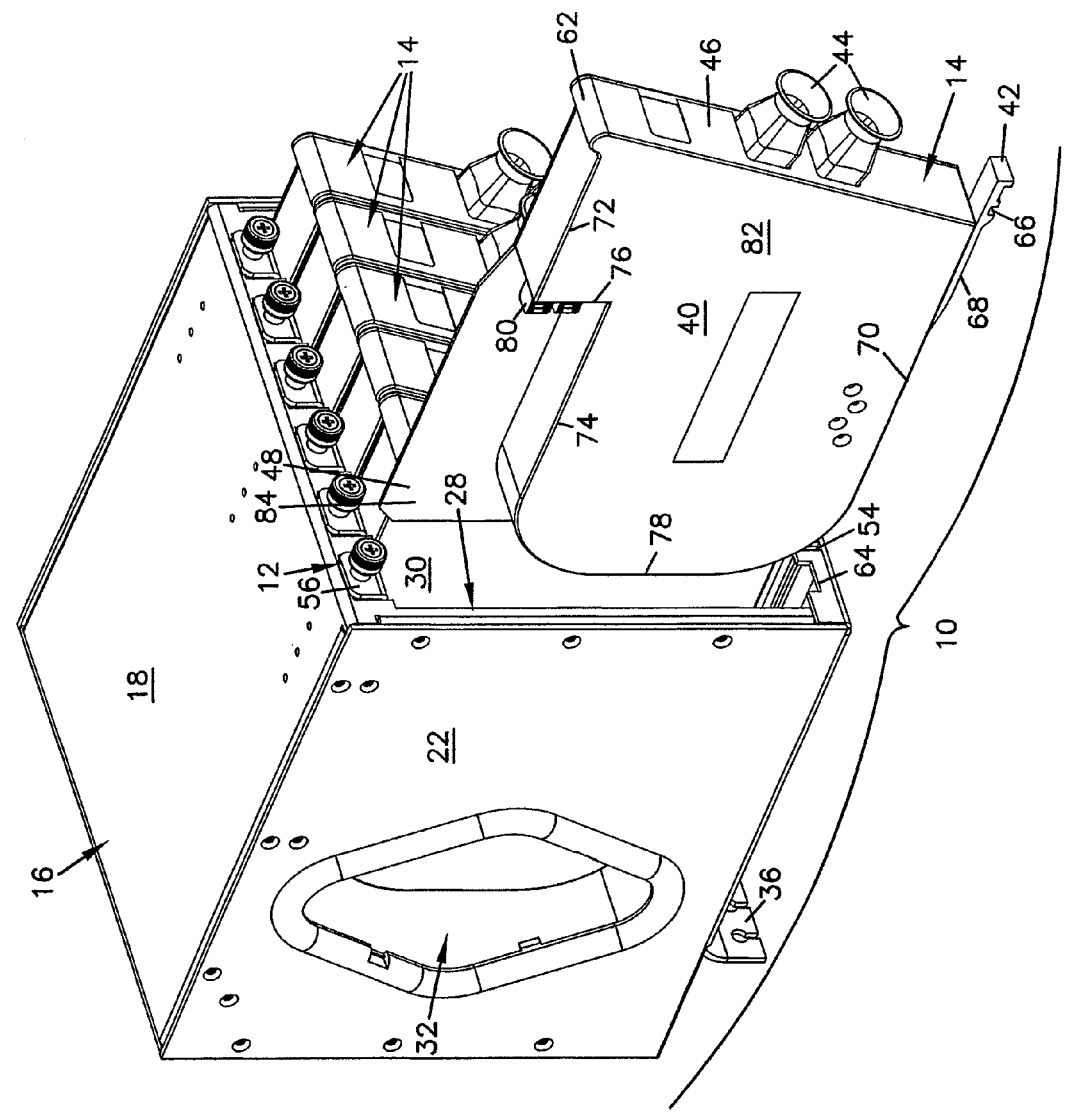
FIG. 7 is a front perspective view of the telecommunications assembly of FIG. 1, with one of the modules exploded out of the assembly and mounting flanges removed from the upper and lower surfaces of the chassis.

Referring now to FIG. 7, latch 42 of module 14 includes a recessed area 66 which engages an edge 64 of mounting location 12 to hold module 14 in place within front opening 28. Recessed area 66 is formed near a distal end of latch 42 and a flexible portion 68 extends from recessed area 66 to a point of connection to a first side 70 of module 14. Flexible portion 68 is resiliently deformable and allows a user to deflect latch 42 to disengage recessed area 66 from edge 64 and remove module 14 from housing 16 or for latch 42 to deflect as module 14 is inserted into front opening 28 and engage edge 64. Module 14 includes a second opposing side 72 and a back 78. An intermediate rear face 76 is formed in second side 72 by an inset side portion 74. A pair of fiber optic connectors 80 is positioned in rear face 76 to mate with fiber optic adapters mounted to adapter holder 56 within interior 30 of housing 16.

Figure 8:
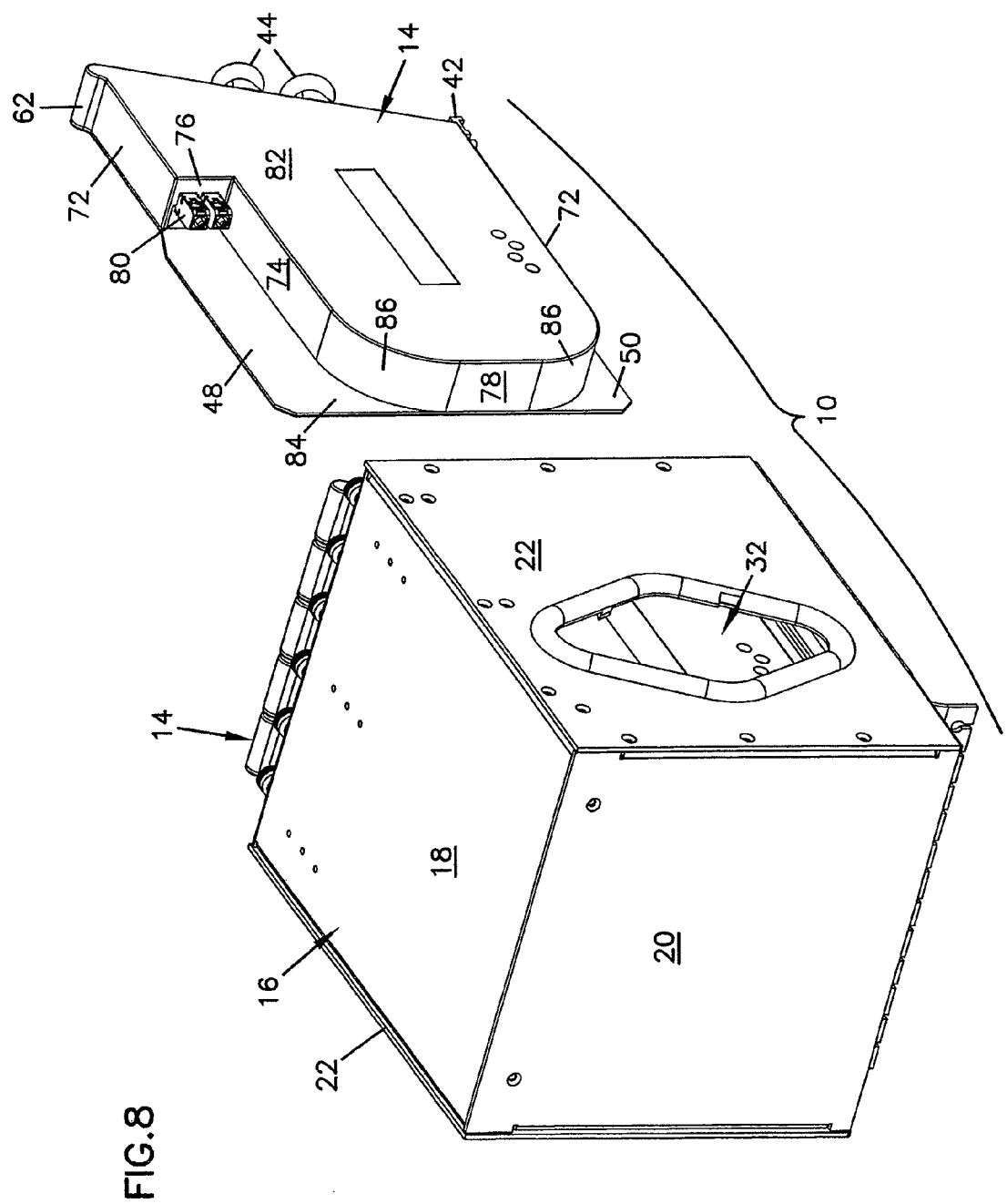
FIG. 8 is a rear perspective view of the telecommunications assembly of FIG. 7.

Module housing 40 also includes a first transverse face 82 extending between first side 70, second side 72, back 78 and front face 46. A second transverse face 84 closes off the opposite side of module housing 40 between front face 46 and back 78 but extends beyond sides 70 and 72 to form flanges 48 and 50 (flange 50 is not visible in FIG. 7). In FIG. 8, flange 50 is visible as an extension of second transverse face 84 beyond side 70 of module 14. Module housing 40 may include curved transitions 86 between sides 70 and 72 and back 78. Transitions 86 may be shaped to provide bend radius protection to cables within interior 30 as the cables extend to adapters 88. Alternatively, sides 70 and 72 may terminate directly at back 78, depending on the needs for placing components within module housing 40 and efficiencies in manufacturing of module housing 40.

Figure 9:
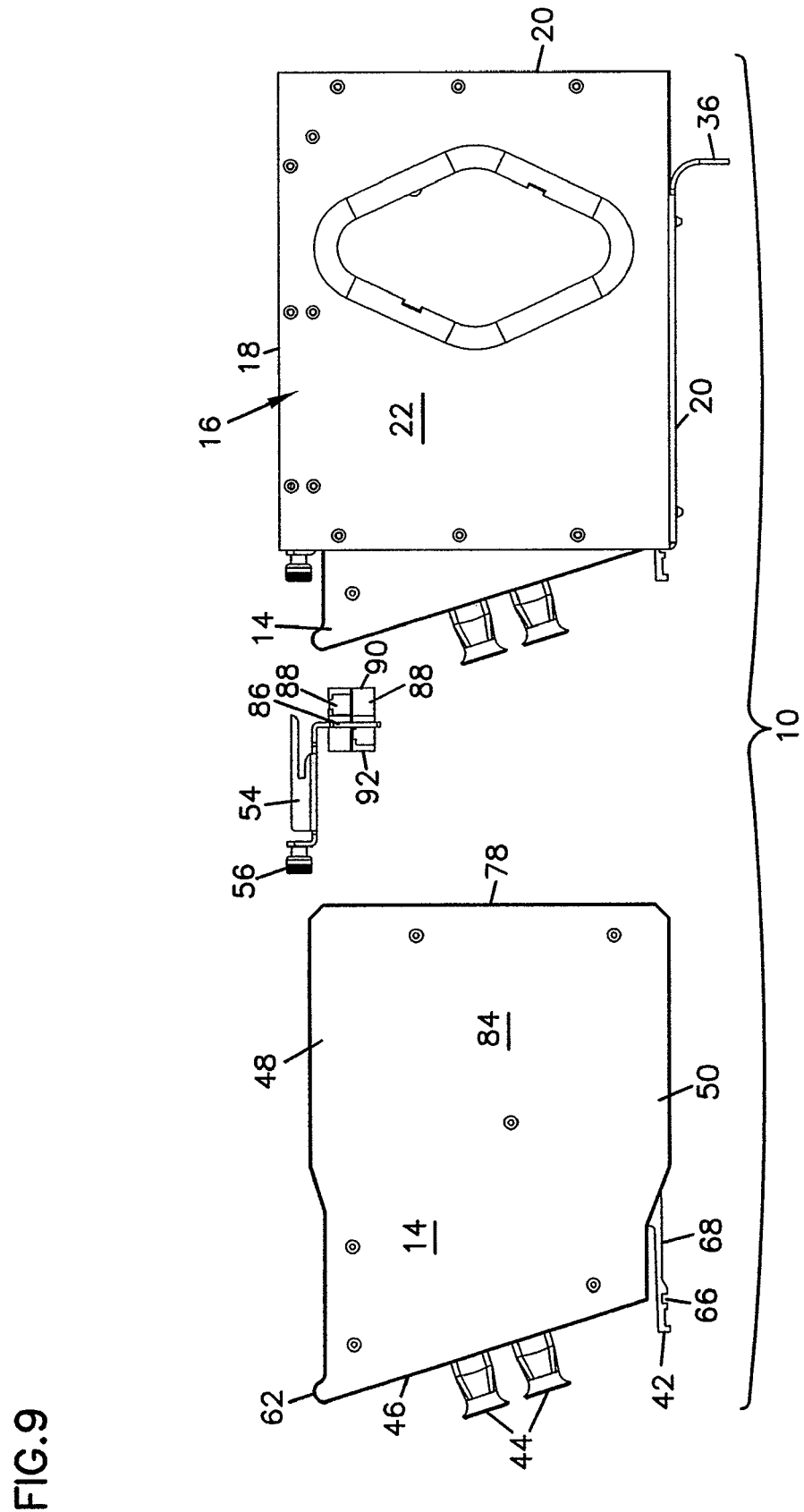
FIG. 9 is a side view of the telecommunications assembly of FIG. 7, with a fiber optic adapter holder exploded out of the assembly.

FIG. 9 shows assembly 10 with adapter holder 54 exploded out from interior 30. Holder 54 includes an extension 86 to hold and position a pair of adapters 88 to engage connectors 80 of module 14. Each adapter 88 includes a first or rear end 90 and a second or front end 92, and each of the first and second ends are adapted to receive a fiber optic connector which may terminate a fiber optic cable.

Figure 10:
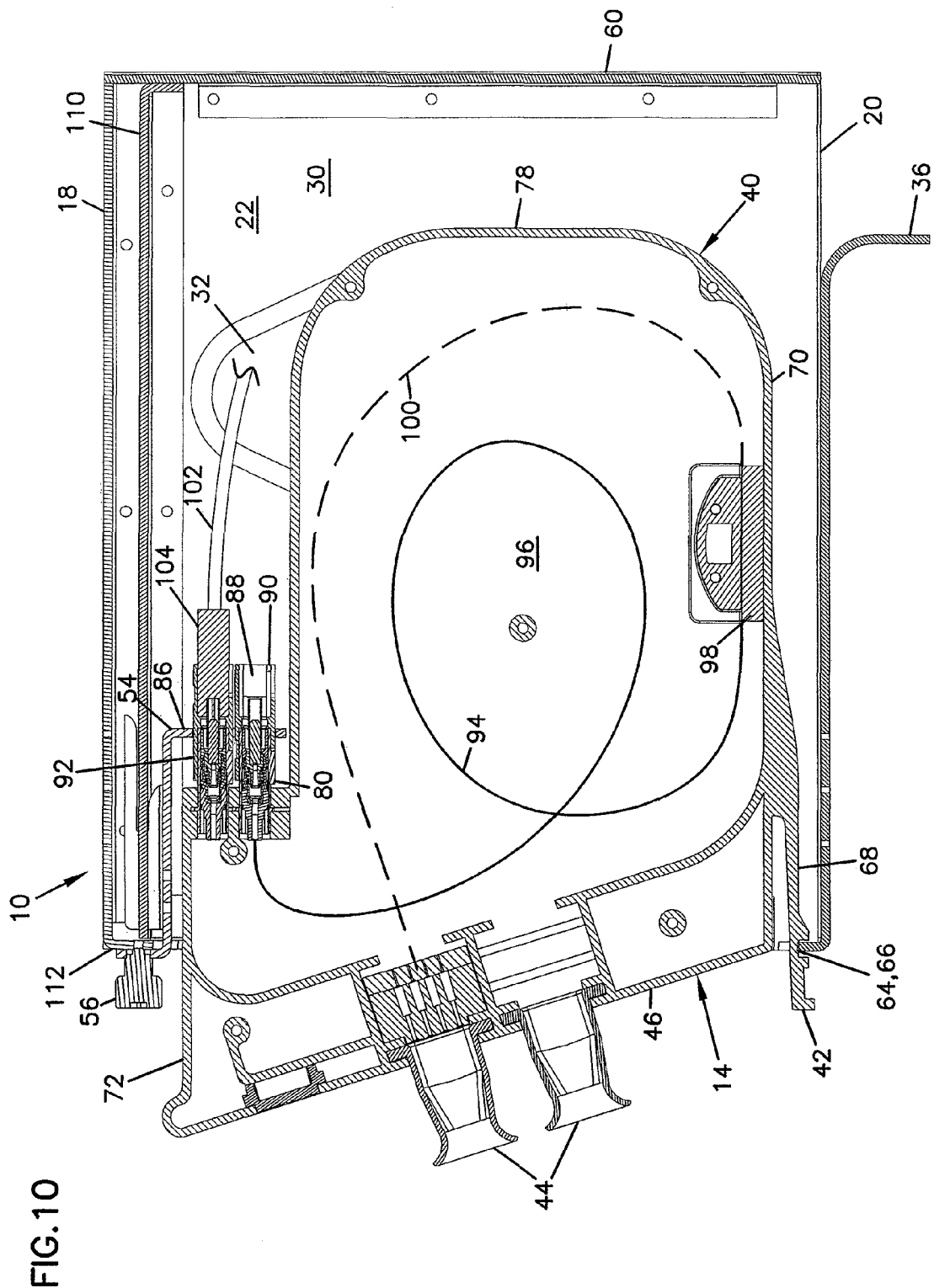
FIG. 10 is a side cross-sectional view of the telecommunications assembly of FIG. 1, taken through the center of one of the modules mounted within the assembly.

FIG. 10 shows a cross-section of assembly 10 with a first cable 94 extending from connector 80 to an optical component 98, mounted within an interior 96 of module housing 40. Optical component 98 may be a splitter or a fan-out or another type of optically significant element. First cable 94 may be a multi-strand fiber cable with a plurality of strands of optical fiber and optical component 98 may be a fanout to separate the individual strands into each of a plurality of second cables 100. Second cables 100 extend from optical component 98 to cable exit 44. Alternatively, first cable 94 may be a single fiber whose signal is separated by optical component 98 which is a splitter and a plurality of second cables 100 carrying portions of the signal from first cable 94 may extend to cable exit 44. The arrangement of optical fiber and sheathing at cable exit 44 may be as disclosed in commonly-owned U.S. patent application Ser. No. 10/658,802, the disclosure of which is incorporated herein by reference.

An outside cable 102 may extend to rear end 90 of adapter 88 and be terminated by a connector 104. Connector 104 may be received in rear end 90 to be optically connected to connector 80 of module 14. Cable 102 may extend from interior 30 of housing 16 through an opening in one of sides 18, 20, or 22 in housing 16.

Figure 11:
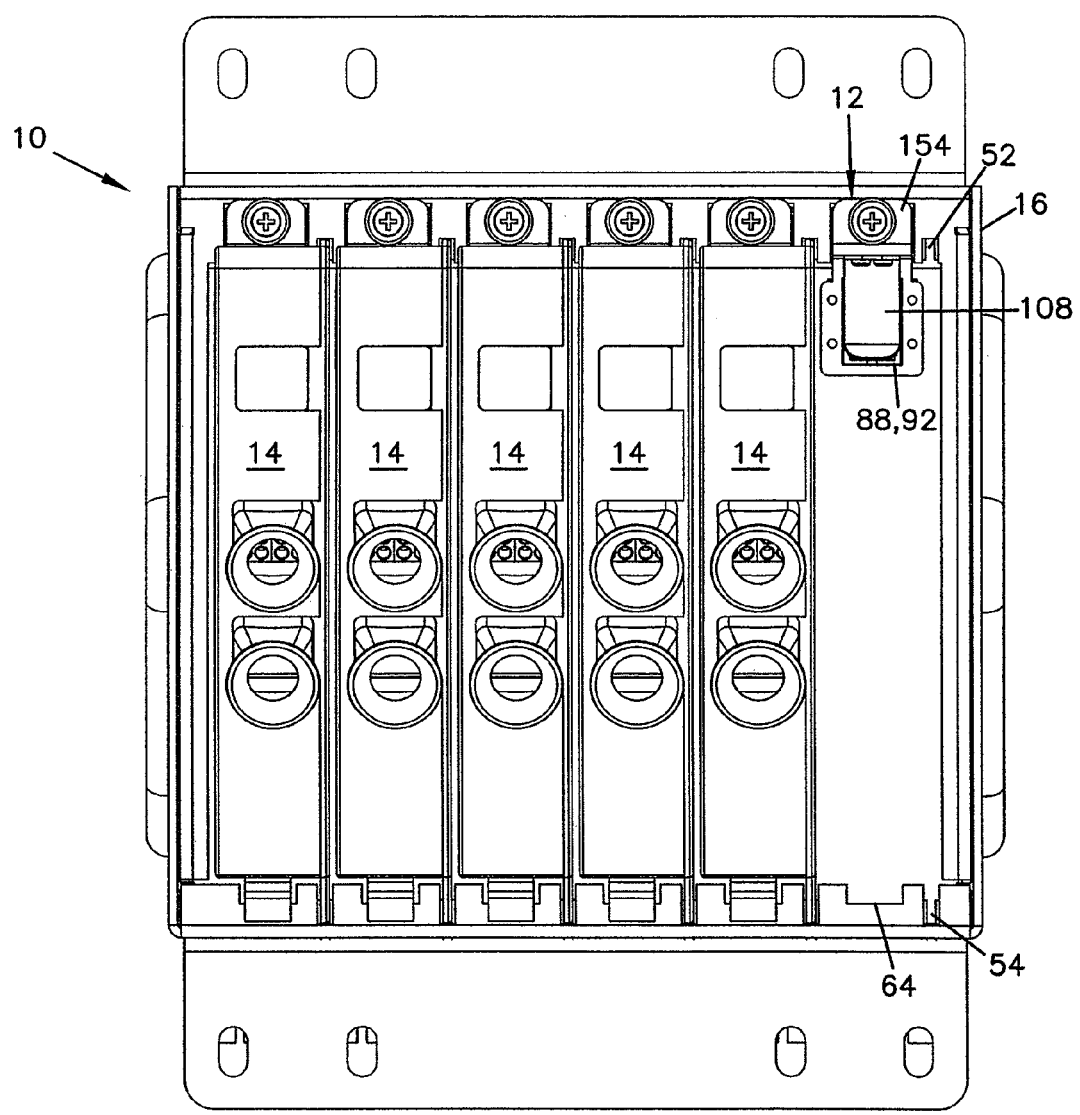
FIG. 11 is a front view of the telecommunications assembly of FIG. 1, with one of the modules removed to show the adapter holder mounted within the interior of the assembly.

Referring now to FIG. 11, assembly 10 has a module removed from one of the mounting locations 12 and includes an alternative adapter holder 154 in that mounting location 12. Holder 154 includes a shield 108 in front of second ends 92 of adapters 88. In some installations, a housing 16 may be installed and a cable 102 led to and connected to first ends 90 of adapters 88, before a module 14 is placed in the associated mounting location 12. If cable 102 is illuminated and transmitting light signals, shield 108 will prevent accidental exposure to these signals which might damage eyes or other sensitive organs, or nearby communications equipment.

Figure 12:
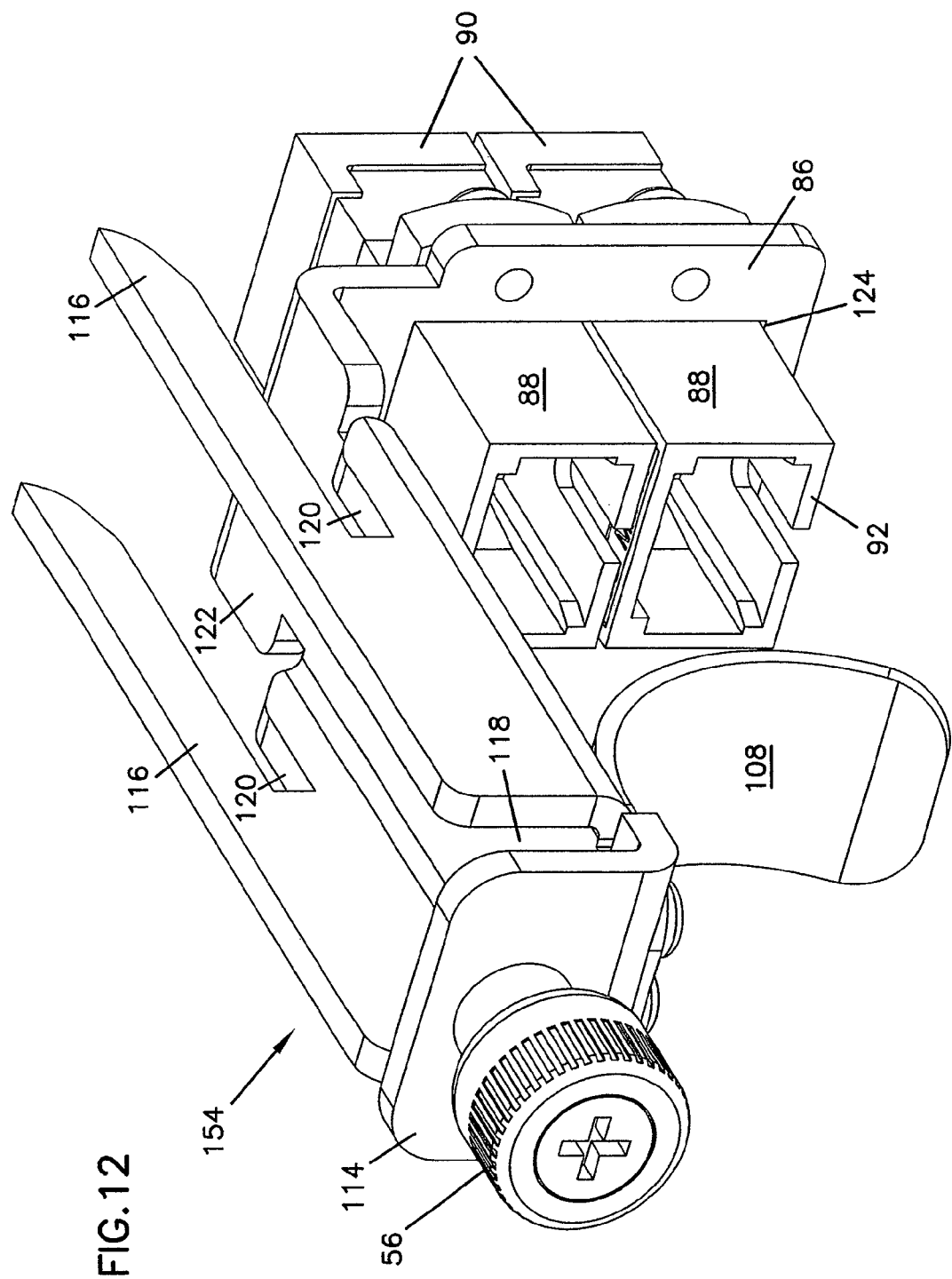
FIG. 12 is a front perspective view of the adapter holder of FIG. 11, removed from the assembly.
Figure 14:
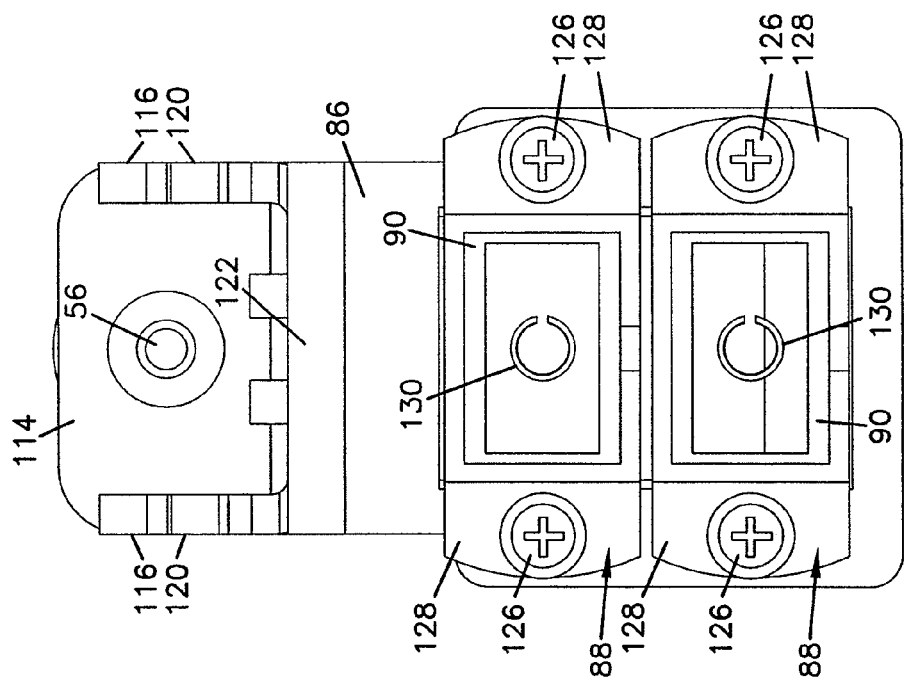
FIG. 14 is a rear view of the adapter holder of FIG. 12.
Figure 13:
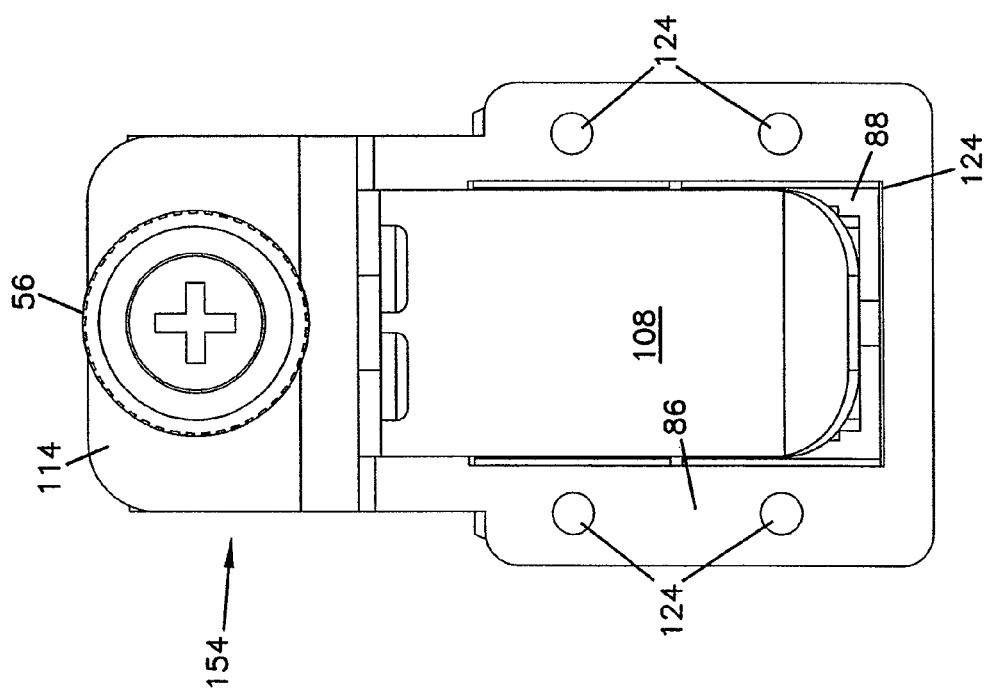
FIG. 13 is a front view of the adapter holder of FIG. 12.

In FIG. 12, holder 154 includes an opening 124 through extension 86 through which adapters 88 are mounted. Thumbscrew 56 extends through a front flange 114 and pair of wall engaging flanges 116 extend backward from adjacent front flange 114. Alternatively, other releasable features, such as snap fit devices, quarter turn fasteners, swell latches or similar features may be used in place of thumbscrew 56 on holder 54 or 154. Positioned between a forward end of each flange 116 and front flange 114 is a slot 118. Toward a rear end of flanges 116 are a pair of wall slots 120. As shown in FIG. 10, an inner wall 110 is positioned within interior 30 offset inwardly from first major surface 18. Wall slots 120 extend along both sides of inner wall 110. A turned-in forward edge 112 of first major surface 18 engages slot 118. These engagements between housing 16 and holder 154 correctly position adapters offset from inner wall 110 within interior 30 to engage connector 80 on rear face 76 of module 14. A central member 122 extends from front flange 114 between wall flanges 116 to extension 86 to correctly position adapters 88 within interior 30 between front opening 28 and rear 60.

Referring now to FIGS. 13 to 16, extension 86 of holder 154 includes a plurality of fastener openings 124 for mounting adapters 88 to extension 86. Fasteners 126 may be extended through side flanges 128 of adapter 88 to permit secure mounting of adapters 88. Adapters 88 are shown as SC style connectors, although other types, styles and formats of adapters may be used within the scope of the present disclosure and connectors 80 and 104 changed to mate with these alternative adapters. Within each of the adapters 88 shown may be an alignment device, such as a split sleeve 130 to correctly position optical fiber terminated in a ferrule and held by connectors 80 and 104. Such alignment devices and termination ferrules are well known in the art.

Shield 108 is curved when viewed from the side, as in FIG. 15, so that shield 108 will be deflected by module 14 as module 14 is inserted into interior 30 through front opening 28 so that connectors 80 can mate with adapters 88. Shield 108 is preferably made of a resilient deformable material that will return to the position shown in FIG. 15 when the module 14 is withdrawn from mounting location 12. Shield 108 may be connected to central member 122 by a pair of fasteners such as screws 132. Alternatively, shield 108 could be connected to holder 154 by being formed integrally with holder 154 or by spot-welding or other fastening techniques. As rear 60 closes off the rear of housing 16 so that is no access to the rear any modules 14 mounted at a mounting location 12, providing a second shield 108 to block light from first end 90 of each adapter 88 is not needed as shown. However, if any sensitive equipment is mounted within module 14 or housing 16, it may be desirable to have a second shield 108 blocking first side 90 of adapters 88.

Insertion of module 14 into housing 16 at one of the mounting locations 12 may include first unfastening thumbscrew 56 and removing holder 54 or 154 from interior 30 through front opening 28. Cable 102 preferably includes enough excess length or slack within interior 30 to permit adapters 88 to be pulled through opening 28. Once positioned outside of interior 30, connector 104 of cable 102 can be removed from first end 90 of adapter 88 to permit a polished endface of an optical fiber within cable 102 to be cleaned. Connector 104 can then be reinserted within first end 90. Holder 54 or 154 can be reinserted within interior 30 so that the holder engages inner wall 110 and inward turned extension 112 and thumbscrew 56 resecured. Insertion of module 14 into front opening 28 begins the mating of module 14 to housing 16 and adapters 88. Flanges 48 and 50 engage slots 52 and 54, respectively, as module 14 is inserted. Connectors 80 and portions of second side 72 engage and deflect shield 108 (if present) as connectors 80 approach second ends 92 of adapters 88. Further insertion of module 14 brings connectors 80 into and contact with adapters 88 and the connectors are received within second ends 92. Latch 42 is deflected inward as module 14 is inserted and then springs back so that recessed area 66 engages edge 64. Module 14 is now mounted within front opening 28 and interior 30 at mounting location 12 and in position to process and transmit signals from cable 102 through first cable 94, optical component 98 and second cable 100 within module interior 96.

The above specification, examples and data provide a complete description of the manufacture and use of the invention. Since many embodiments of the invention can be made without departing from the spirit and scope of the invention, the invention resides in the claims hereinafter appended.

What is claimed is:

1. A fiber optic telecommunications assembly comprising:
   (a) a housing defining an open front and a back opposite the open front;
   (b) at least one fiber optic adapter mounted to the housing, the fiber optic adapter configured to mate with a telecommunications module inserted through the front of the housing, the fiber optic adapter including a front end and a rear end, each end of the fiber optic adapter configured to receive a mating fiber optic connector, the front end positioned to receive a first mating fiber optic connector of the telecommunications module inserted through the front toward the back and the rear end positioned to receive a second mating fiber optic connector of a fiber optic cable; and
   (c) a telecommunications module mounted to the housing, the telecommunications module including:
      a module housing defining a front end and a rear end; and
      the first mating fiber optic connector, the first mating fiber optic connector being mounted to the module housing at an intermediate mounting location forwardly offset from the rear end of the module housing and rearwardly offset from the front end of the module housing, the fiber optic connector having an interface end that faces in a rearward direction, the interface end of the fiber optic connector being accessible from outside the module housing and including a ferrule;
   (d) wherein the telecommunications module is mounted within the
   housing separately from the fiber optic adapter such that the ferrule of the first mating fiber optic connector of the telecommunications module engages the fiber optic adapter mounted to the housing when the telecommunications module is mounted to the housing.

2. A fiber optic telecommunications assembly according to claim 1, wherein the telecommunications module includes a flexible latching tab for being removably mounted to the housing with a snap-fit interlock.

3. A fiber optic telecommunications assembly according to claim 1, wherein the telecommunications module includes at least one optical component, a first optical fiber cable extending from the first mating fiber optic connector to the optical component and at least one second optical fiber cable extending from the optical component to a cable exit location of the telecommunications module.

4. A fiber optic telecommunications assembly according to claim 3, wherein the optical component is an optical splitter, the first optical fiber cable includes a single strand of fiber and a plurality of second optical fiber cables extend from the optical component to the cable exit location of the telecommunications module.

5. A fiber optic telecommunications assembly according to claim 1, wherein the at least one fiber optic adapter is removably mounted to the housing.

6. A fiber optic telecommunications assembly according to claim 1, wherein the cable exit location of the telecommunications module is at the front end.

7. A fiber optic telecommunications assembly according to claim 1, wherein the housing defines a plurality of mounting locations and at least one fiber optic adapter mounted at each of the mounting locations.

8. A fiber optic telecommunications assembly according to claim 7, further comprising a plurality of the telecommunications modules mounted to the housing.

9. A fiber optic telecommunications assembly according to claim 7, wherein the telecommunications module includes a pair of opposing mounting flanges and each mounting location includes a pair of opposing slots for receiving the mounting flanges, one of the mounting flanges being larger than the other and only one of the slots being sized to receive the larger flange.

* * * * *